H. P. KRAFT.
BRIDGE WASHER.
APPLICATION FILED SEPT. 1, 1915.

1,199,907.

Patented Oct. 3, 1916.

WITNESSES:
Rene Bruine
Fred White

INVENTOR
Henry P. Kraft,
By Attorneys,
Fraser, Dunn & Myers

UNITED STATES PATENT OFFICE.

HENRY P. KRAFT, OF RIDGEWOOD, NEW JERSEY.

BRIDGE-WASHER.

1,199,907.      Specification of Letters Patent.      Patented Oct. 3, 1916.

Application filed September 1, 1915. Serial No. 48,390.

*To all whom it may concern:*

Be it known that I, HENRY P. KRAFT, a citizen of the United States of America, residing in Ridgewood, in the county of Bergen and State of New Jersey, have invented certain new and useful Improvements in Bridge-Washers, of which the following is a specification.

This invention relates to bridge washers, and aims to provide certain improvements therein.

In the use of pneumatic tire valves it is common to provide a so-called bridge washer which is carried by the valve casing, and is adapted to fit between the inner edges of the tire shoe to prevent movements of the valve. The valve is usually provided with an inner flange which fits inside of the inner tube, and with a so-called ring washer which is pressed against the outer side of the tube whereby the valve is clamped in the tube. Usually the clamping action is effected by a nut screwing on the exterior of the valve and forcing the bridge washer and ring washer inwardly. The ring washer and bridge washer are provided with oblong openings through which the valve casing extends, the latter being flattened on two sides to correspond to the shape of such openings. The result of this construction is that both the bridge washer and ring washer are non-rotatively held on the casing. The valve is formed next to its flange with a reduced neck in which the inner tube fits, but the ring washer is of greater thickness than such neck, so that it still engages the flattened casing when it is forced against the inner tube.

The ring washer is usually formed with a corrugated or roughened face to assist in holding the inner tube firmly clamped against the flange. The bridge washer for cheapness and convenience of manufacture has been made of sheet metal, and the ring washer has been made separately therefrom and of thicker material. According to the present invention the bridge washer has been constructed to perform the additional function of the ring washer while retaining the present gage of metal. I am enabled to accomplish this by providing the bridge washer with a corrugated face and a collar or flange extending from the washer in such manner that it engages the flattened sides of the valve and prevents turning of the valve, even when clamped against the inner tube to the maximum extent.

Figure 1:
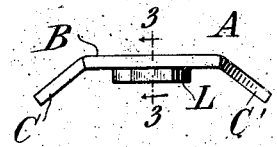
Figure 3:
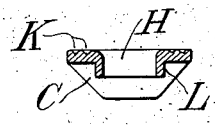
Figure 2:
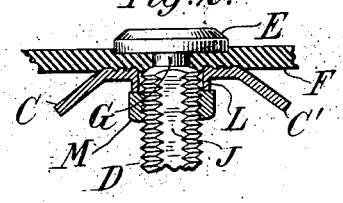
Figure 4:
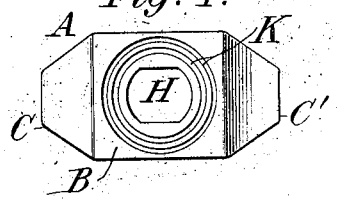
Figure 5:
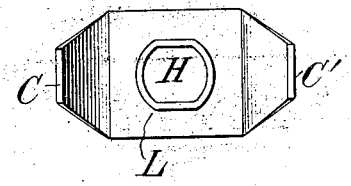

In the drawings which illustrate one form of the invention, Figure 1 is a side elevation of the improved bridge washer. Fig. 2 is a sectional view of the same as applied to a tire valve. Fig. 3 is a cross-sectional view of Fig. 1 on the line 3—3. Fig. 4 is a top view of the washer. Fig. 5 is an inner or bottom view.

Referring to the drawings, let A indicate the washer as a whole which is formed with a body portion B and inclined ends C C' which, as shown in Figs. 4 and 5, are tapered to fit between the inner edges of the tire shoe.

Referring to Fig. 2, D is the usual form of tire valve having an inner flange E which passes within the inner tube F of the tire. The valve is formed with a neck or reduced portion G into which the tire tube fits when the valve is in place. The bridge washer is formed with an oblong hole H which fits over the valve casing, the latter being provided with flattened sides J so that the washer is not capable of rotation with relation to the valve casing.

Referring to the present invention, I form a series of corrugations, such as K, on the top side of the bridge washer which are adapted to bear against the inner tube F and clamp the same against the flange E. If the bridge washer were formed of the ordinary thickness of metal which is desirable from the standpoint of economy and ease of production, it would be apt to slip down around the neck G of the valve when forced against the inner tube, and thus be liable to displacement and rotation about the valve, which is undesirable. I, therefore, form on the bottom of the washer a flange or collar L which when the washer is made of sheet metal is preferably stamped down, as best indicated in Figs. 1 and 3. The flange L, as illustrated in Fig. 5, has the same oblong shape as the hole H, and is thus adapted to engage the flattened valve casing to prevent rotation of the washer. The flange or collar L is of sufficient depth to engage the flattened portion of the valve casing in any position which the bridge washer will assume in use. It is thus insured that the bridge washer will always remain in its proper position and not be subject to rotative movements around the casing. Any suitable means may be employed for forcing the bridge washer toward the inner tube, such as the usual nut M.

While I have shown and described one form of the invention it will be understood that I do not wish to be limited thereto, as various improvements may be made therein without departing from the invention. It will, of course, be understood that the shape of the bridge washer is unessential, so long as it performs the function of gripping the tire shoe or casing.

What I claim is:—

As a new article of manufacture, a bridge washer adapted for use with a valve stem having a flattened side portion and having its neck reduced in diameter adjacent an end to receive a tire tube, said bridge washer formed of sheet metal and provided with a passageway therethrough and having on its outer side a relatively broad face adapted to contact with said tire tube over a considerable area in lieu of a ring washer, a flange on said bridge washer bordering said passage and extending from the inner face of the bridge washer, said flange and washer having with said tube a width greater than the said reduced portion of said neck, whereby said flange is adapted to embrace the body of said tire valve inwardly of its neck, said flange being turned at substantially right angles to the inner face of the bridge washer and having a flattened portion to engage the flattened portion of said valve.

In witness whereof, I have hereunto signed my name in the presence of two subscribing witnesses.

HENRY P. KRAFT.

Witnesses:
   THOMAS F. WALLACE,
   FRED WHITE.